United States Patent [19]
Bene

[11] 3,778,884
[45] Dec. 18, 1973

[54] METHOD OF MANUFACTURING A SINK COMPRISING A BENCH AND A BASIN

[76] Inventor: Pierre Yves Bene, 30 Route de chazieres 69, Lyon, France

[22] Filed: May 1, 1972

[21] Appl. No.: 249,372

[52] U.S. Cl. ................................. 29/512, 4/187 A
[51] Int. Cl. ...................... B21d 39/00, B23p 11/00
[58] Field of Search ..................... 29/511, 512, 505; 4/187 A

[56] References Cited
UNITED STATES PATENTS

| | | | |
|---|---|---|---|
| 1,930,102 | 10/1933 | Liner | 29/512 |
| 1,965,648 | 7/1934 | Jackson | 29/512 UX |
| 2,024,244 | 12/1935 | Nelson | 29/511 |
| 2,475,112 | 7/1949 | Stanitz | 29/512 UX |
| 2,779,997 | 2/1957 | Barman | 4/187 A UX |
| 2,790,181 | 4/1957 | McCarthy | 4/187 A |
| 3,034,146 | 5/1962 | Lyon | 29/511 X |

Primary Examiner—Charlie T. Moon
Attorney—Robert E. Burns et al.

[57] ABSTRACT

According to the disclosure a sink formed of sheet metal or including sheet metal in its manufacture comprises a connecting flange joining a bench and a basin. The method of manufacturing the sink includes the steps of fitting the flange onto the bench and then subsequently onto the basin.

1 Claim, 3 Drawing Figures

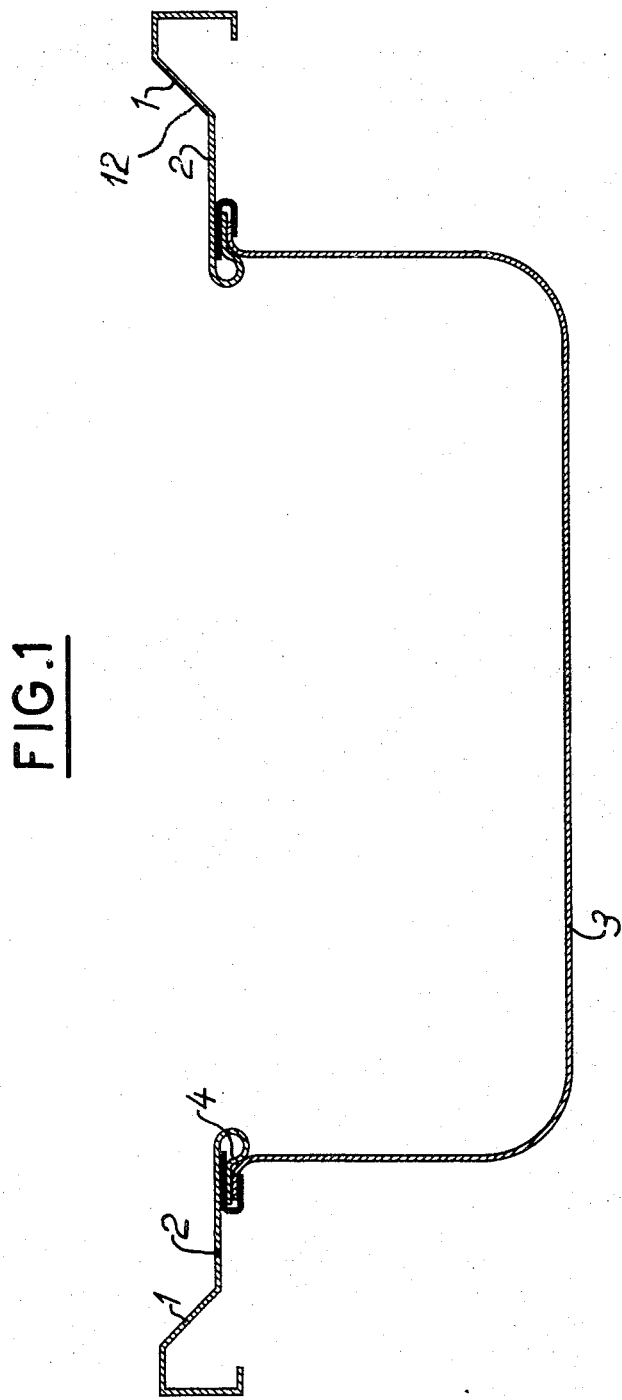

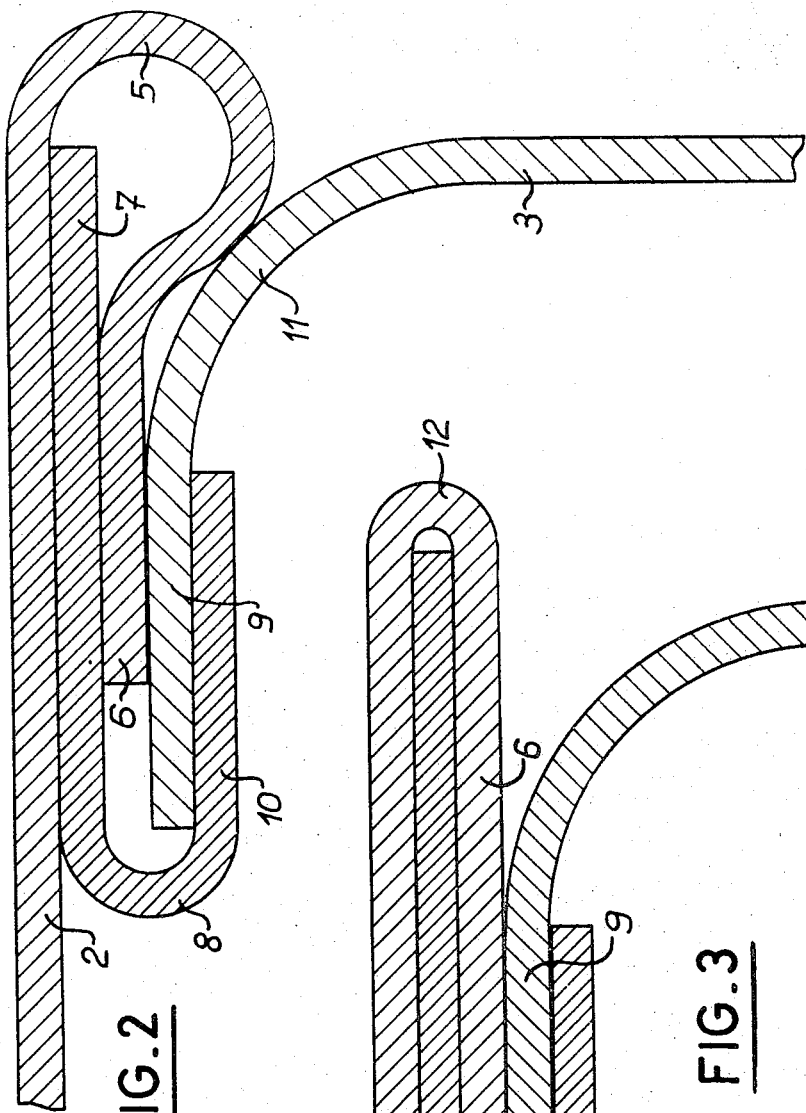

METHOD OF MANUFACTURING A SINK COMPRISING A BENCH AND A BASIN

The invention relates to improvements in sinks and to methods of manufacture thereof and more particularly metal sinks formed for example, of stainless steel.

Existing sinks have a number of disadvantages, particularly regarding strength, durability and cost.

Hitherto sinks were manufactured by a series of operations such as follows:

Positioning of the sink basins on a bench by means of a template and electric spot-welding.

Welding of the two basins onto the bench with a welding machine (generally a seam welding machine).

Rubbing down the strips of weld material on a semi-automatic abrasive band machine.

Polishing the weld strips by means of various tools fitted on a manual, flexible polishing device.

Cleaning the sink before final inspection.

These operations are relatively long and give rise to a sink-manufacturing time which is of the order of 45/100 of an hour for sinks with two basins. It is obvious that this manufacturing time has a direct effect on the cost price.

Moreover, a sink made according to the aforesaid method has the following faults:

thinning-out of the metal caused by seam-welding ; for example two sheets of metal of 0.8mm when welded together have a thickness of about 1.2mm.

In addition, in order that the welding will not show, it is necessary to grind or rub it down at a tangent starting the end of the weld and finishing at the top of the rounded part of the basin. Due to this, it often occurs that the thickness of the sheet becomes very slight, and it sometimes occurs that the corners of the basin are cut.

In addition, the sinks are liable to deformation due to the welding heat which often results in undulations of varying degrees on the underneath of the bench around the basin.

Other faults appear in time, under the pressure of use, at the joint of the basin and the bench.

An object of the invention is to provide a sink and a method of manufacture thereof in which the aforementioned disadvantages are avoided or substantially reduced and provides a product with a high degree of strength, particularly in the assembly of the basin and the bench.

According to the invention a sink formed of sheet metal or including sheet metal in its manufacture comprises a connecting flange joining a bench and a basin.

A sink formed according to the invention can have a good degree of regularity in the circumference of the basin and the top of the sink can have an appearance of high quality due to the absence or substantial absence of undesired deformation of the metal. In addition, there is the improved chance that no fault will appear during its lifetime when the sink is in use.

According to a further aspect of the invention a method of manufacturing the sink includes the steps of fitting the flange onto the bench and then subsequently onto the basin.

The invention will now be further described by way of example with reference to the accompanying drawings in which :

FIG. 1 is a cross section of the sink comprising a single basin connected to a bench according to the invention ;

FIG. 2 is a section, on a larger scale, of the connection between the basin and bench in FIG. 1, and, FIG. 3 is a section of a modification of the connection in FIG. 2.

Referring to FIG. 1, the sink 1 comprises a bench 2 and a basin 3 connected by a flange 4 which will be described in more detail with reference to FIG. 2 in which it will be noted that ;

At this end, the bench 2 has a bent edge forming a marginal shoulder 5 terminated by a rim 6 gripping one side 7 of a flange 8.

Moreover, an edge 9 of the basin 3 is placed in direct contact with the rim 6 of the bench and held against it by a second side 10 of the flange.

The carrying out of this assembly may be effected in several successive operations. The flange 8 in an unbent form is placed in contact with the lower surface of the bench 2. Thus the rounded part 5 and the gripping of the side 7 by bending are produced in such a way that the said side 7 is gripped between the rim 6 and the bench 2.

In a second operation, the preformed basin 3 comprising a rounded part 11 and the edge 9 is taken and the second side 10 of the flange 8 bent over the edge 9 which is held against the rim 6.

The various operations are preferably carried out cold, which enables the metal to retain an immaculate or at least a substantially pleasing appearance.

As an example, the method generally comprises the following stages of manufacture :

stamping out of the bench part from a sheet of metal to form the peripheral rim 12 ;

then forming it into a rectangle, and cutting the angles for the corners ;

cutting out an aperture to receive the basin ;

the production by stamping of a drop perpendicular to the plane of the bench, to define the aperture for receiving the basin ;

stamping out the basin ;

the production by cutting and stamping of a peripheral rim 9;

boring of the holes for the waste pipe and overflow aperture;

flat cutting out of the flange ; the flange will preferably be made in four separate sections, welded end-to-end ;

stamping of the flange in a straight section of L-shape the base of the L being formed on the inside ;

positioning of the flange around the perpendicular drop, the base being arranged on the back of the bench ;

fitting in one or more operations of the drop part, which becomes the rim 6, on the base of the L of the flange 8, which becomes the side 7 (FIG. 2) ;

fitting a seal on the rim 6 ;

positioning of the basin 3 by the application of the edge 9 on the seal, itself resting on the rim 6 ;

fitting in one or more operations of the vertical part of the L, which becomes the side 10, onto the edge 9 of the basin.

Throughout the method it is possible to retain a protective covering on the metal, particularly an advantage in the case of stainless steel, a thus reduced risk of scratching.

In addition, it is possible to use sheets of steel having motifs of different textures. It is also possible to connect a stainless steel bench to a basin of rigid synthetic material, which produces surprising aesthetic effects.

Moreover, the rigidity of the assembly is reinforced to a larger extent due to the extra thickness formed by the assembly.

In FIG. 3 the rounded part 5 of FIG. 2 is replaced by a simple bend 12, rim 6, flange 8, the edge 9 and the method of gripping remaining the same.

It has been ascertained that, in the method described above with reference to the drawings, the manufacture of a sink comprising one basin requires a period of about 10/100 of an hour, and the manufacture of a sink with two basins about 15/100 of an hour. The comparison of this with the time required for manufacturing a welded sink shows that more advantageous cost price can be fixed for the sink formed according to the invention and described with reference to the drawings.

Although two embodiments of the invention have been described by way of example it is understood that the invention is in no way limited by this and that various modifications of form and material can be used without diverging from the invention.

What I claim is:

1. Method of manufacturing a sink formed of sheet metal and comprising a bench and a basin having an upper edge connected together, comprising the steps consisting successively in placing a first flat sheet portion of connecting flange in contact with the lower surface of said bench, folding back on itself the edge portion of said bench for creating a rim such that said first flat sheet portion of the connection flange be gripped between said rim and said bench, applying the edge of said basin against the folded rim of said bench and folding back a second sheet portion of the connecting flange under the edge of said basin for constituting an U-shaped flange riding on said rim of said bench and said edge of said basin.

* * * * *